Dec. 28, 1965 H. SCHEFTELOWITZ 3,226,485
DISTORTION COMPENSATION AT WIDE-BAND TRANSMISSION
OVER A NUMBER OF EQUAL NARROW-BAND CHANNELS
Filed Feb. 6, 1962 2 Sheets-Sheet 1

INVENTOR
HENRY SCHEFTELOWITZ
BY Hane and Nydick
ATTORNEYS

Dec. 28, 1965 H. SCHEFTELOWITZ 3,226,485

DISTORTION COMPENSATION AT WIDE-BAND TRANSMISSION OVER A NUMBER OF EQUAL NARROW-BAND CHANNELS

Filed Feb. 6, 1962 2 Sheets-Sheet 2

INVENTOR
HENRY SCHEFTELOWITZ
BY Kane and Nydick
ATTORNEYS 3,226,485

DISTORTION COMPENSATION AT WIDE-BAND TRANSMISSION OVER A NUMBER OF EQUAL NARROW-BAND CHANNELS

Henry Scheftelowitz, Hagersten, Sweden, assignor to Telefonaktiebolaget L M Ericsson, Stockholm, Sweden, a corporation of Sweden Filed Feb. 6, 1962, Ser. No. 171,508

Claims priority, application Sweden, Feb. 20, 1961, 1,749/61

3 Claims. (Cl. 179—15)

The invention relates to a circuit system for compensating distortions of the signals transmitted in a time-division multiplex system including transmitting means and receiving means connected by several similar transmission panels and in which an input signal fed to the transmitting means and having a frequency wider than the band width of each of said channels is time-divided. The pulses thus obtained are distributed upon said channels, and the pulses received in the receiving means are scanned and combined to an output signal.

The transmission of a signal having a certain frequency band can be effected by means of an equipment operating according to the time division principle and comprising a number of mutually equal transmission channels, if the transmission ability of each channel is limited by an upper cut-off frequency which is lower than the highest frequency of the frequency band fed to the equipment. In such equipments the incoming signal is time divided and the obtained pulses are distributed over the different transmission channels. The pulses are then scanned on the output side of the equipment and combined to a voltage which shall correspond to the one fed to the equipment. With such a transmission the pulses which are fed to each channel must be very short to avoid an excessive distortion of the received signal. The use of very short pulses causes, however, that the signal obtained on the output side becomes strongly attenuated. If longer pulses in the channels are used to avoid this attenuation, the received signal obtains a strong distortion. The distortion is directly proportional to the pulse length. A study of this distortion shows that in the amplitude spectrum of the received frequency band the amplitude as a function of the frequency is not a straight line but a curve with discontinuities. As a result, the distortion cannot without great difficulties be neutralized by conventional attenuation compensating arrangements.

The purpose of the present invention is to make use of long pulses in the transmission channels without appreciable distortion of the received signal. This is possible by connecting to the output side of the equipment a low pass filter for filtering out the frequency band from the transmitted voltage, which frequency band corresponds to the original band fed to the equipment, and also a band pass filter for filtering out a side band which belongs to some harmonic side wave in the transmitted voltage a demodulator is connected to the band pass filter for demodulation of said side band with a carrier wave of the same frequency as said harmonic side wave and a circuit component, for example a transformer, is connected to said demodulator and to said low pass filter for adding said filter frequency band.

Figure 1:
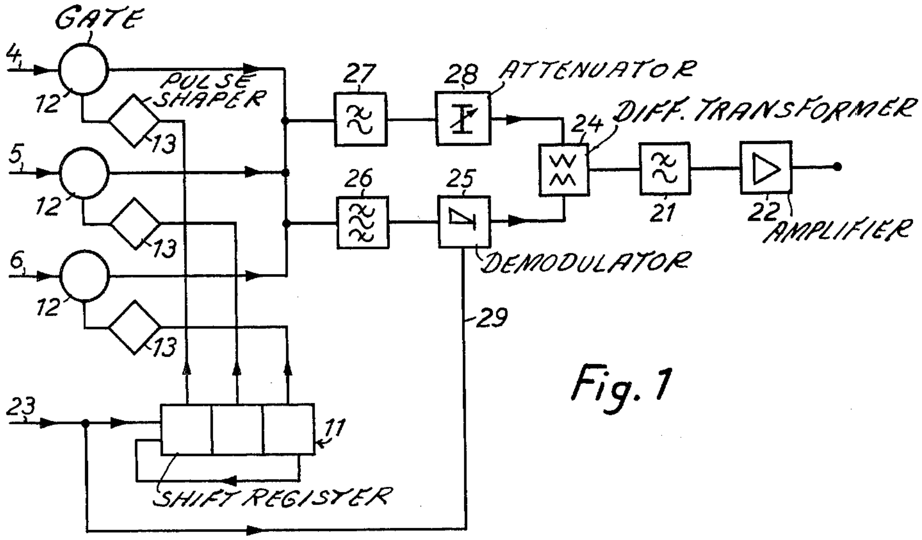
Figure 2:
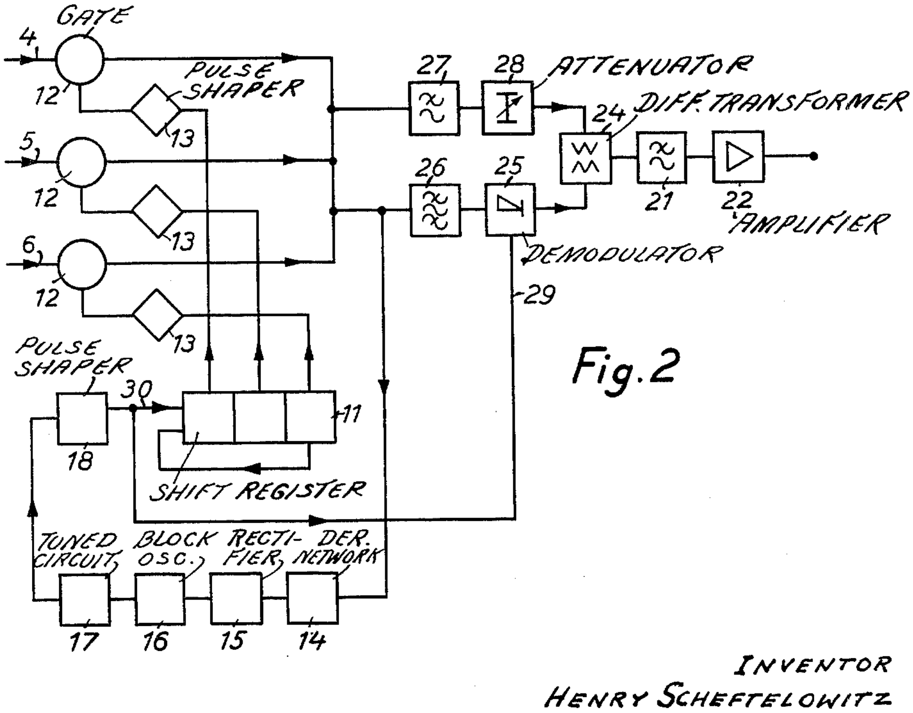
Figure 3:
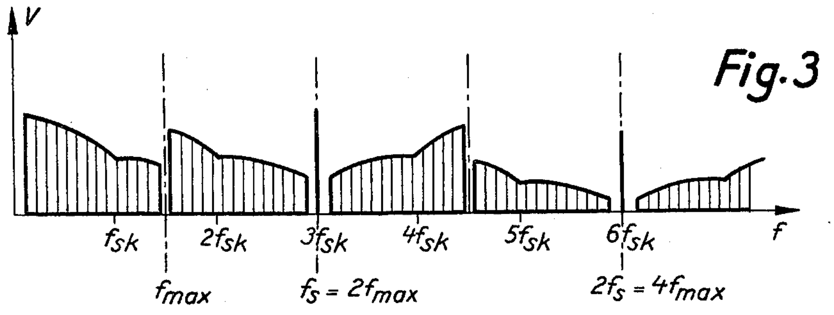
Figure 4:
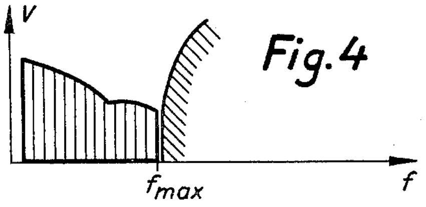
Figure 8:
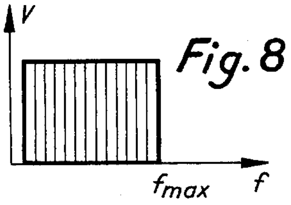
Figure 5:
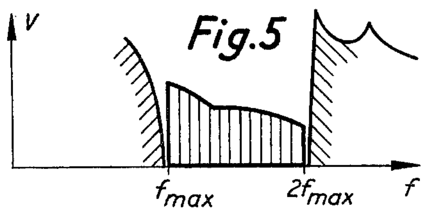
Figure 9:
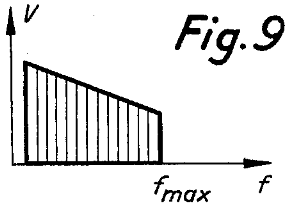
Figure 6:
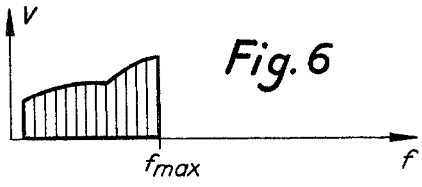
Figure 7:
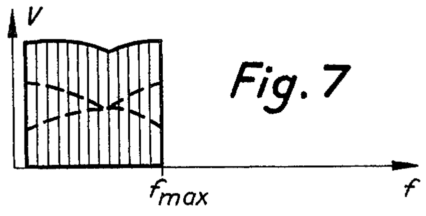

The circuit system of the invention will be further described in connection to the accompanying drawings, in which FIGS. 1 and 2 show the output side of two transmission equipments, which are provided with circuit systems in accordance with the invention, FIG. 3 shows the spectrum of the signal obtained on the output side, FIG. 4 shows the original frequency band fed to the equipment after filtering, FIG. 5 shows a filtered sideband of a side wave in the received signal voltage, FIG. 6 shows said sideband demodulated, FIG. 7 shows the obtained frequency band added to the frequency band filtered out by the low pass filter, FIG. 8 shows the original frequency band, which was fed to the equipment, and FIG. 9, finally, shows the corresponding frequency band which is expected on the output side after the filtering.

The voltage obtained on the output side of the equipment after the scanning contains the original frequency band which was fed to the transmission equipment, and a number of harmonic side waves with appertaining upper and lower side bands. This is illustrated in FIG. 3, which shows the amplitude spectrum of the received signal with the amplitude V represented as a function of the frequency $f$. In FIG. 3 $f_{sk}$ indicates the scanning frequency per channel and $f_s$ the total scanning frequency. The highest frequency that occurs in the original frequency band, which was fed to the equipment, is indicated at $f_{max}$. As appears from FIG. 3, the harmonic side waves appear at the frequency which is equal to the product of the number of channels and the scanning frequency per channel, the total scanning frequency $f_s$, and also at frequencies which are even multiples of said frequency, thus $2f_s$, $3f_s$, $4f_s$ and so on. From FIG. 3 appears also that the amplitude as a function of the frequency is not a straight line but consists of a curve which shows discontinuities. These discontinuities appear at even multiples of the scanning frequency per channel, thus at $f_{sk}$, $2f_{sk}$, $3f_{sk}$, $4f_{sk}$ and so on. The original frequency band fed to the transmission equipment has the appearance shown in FIG. 8. The corresponding frequency band which is obtained on the output side may be expected to take the appearance shown in FIG. 9. The distortion shown in the frequency band in FIG. 9 can be neutralized by a conventional attenuation compensating network. The frequency band which is obtained on the output side, however, takes the appearance shown in FIG. 4. Said frequency band can be filtered by a low pass filter, the attenuation diagram of which also is indicated in FIG. 4. By a band pass filter a side band can also be filtered out which side band belongs to some harmonic side wave in the received voltage. This is shown in FIG. 5, in which also the attenuation diagram of the filter is indicated. The filtered frequency band is demodulated in a demodulator with a carrier frequency of the same frequency as the harmonic side wave to which the side band in question belongs. The frequency band which is obtained after this modulation is shown in FIG. 6. Said frequency band is added to the frequency band which was previously filtered out by the low pass filter and shown in FIG. 4. However, said last-mentioned frequency band has first been given the same mean level as the frequency band obtained after the demodulation. The result of the addition of the two frequency bands is shown in FIG. 7, from which appears that the amplitude V as a function of the frequency $f$ shows a very insignificant distortion compared with the frequency band which would have been obtained and is shown in FIG. 4, if the circuit system according to the invention had not been provided.

FIGS. 1 and 2 show the output side of equipments which comprise a number of mutually equal transmission channels. On the input side of these equipments the incoming signal is time divided in a number of pulses, which are distributed over the different transmission channels. This can be effected for example by gate circuits which are connected to each channel. On the output side of the equipment gate circuits 12 are connected in each channel. The pulses in the different transmission channels 4, 5 and 6 are scanned by means of these gate circuits and combined in an outgoing line. The gate circuits 12 are in turn fed with pulses from a shift register 11 through a pulse-forming network 13. In order to obtain synchronism between the gate circuits on the output side and corresponding gate circuits on the input side, a separate channel 23 is used in the equipment in FIG. 1 for transmission of control pulses to the shift register 11 from a pulse generator on the input side of the equipment, which pulse generator feeds the respective gate circuits. In the equipment according to FIG. 2 these control pulses are regenerated in a known way by passing the received signal through a derivating network 14, a rectifier 15, a blocking oscillator 16, an oscillation circuit 17 which is tuned to the frequency of the generator on the sending side, and a pulse-forming network 18. The thus obtained pulses are then fed to the shift register 11. The pulses, which occur per channel, have a repetition frequency equal to $f_{sk}$. The total repetition frequency $f_s$ on the output side of the equipment is then equal to the product of the number of channels and the repetition frequency per channel, thus in this case $f_s=3f_{sk}$. To decrease the distortion in the signal obtained on the output side two different frequency bands are filtered out, as previously mentioned, from said signal, which frequency bands are then added. By a low pass filter 27 connected to a point on the output side of the equipment, which is common for the different transmission channels, the frequency band corresponding to the one which was originally fed to the equipment is filtered out. By a band pass filter 26 which is connected to the same point on the output side of the equipment, a wanted side band is filtered out to a harmonic side wave in the received signal. Said side band is applied to a demodulator 25 which is also fed with a carrier frequency of the same frequency as said harmonic side wave. In this case a side band is chosen, which belongs to a side wave with $f_s=3f_{sk}$. The necessary carrier wave is obtained through a connection 29. In the equipment in FIG. 1 the latter is connected to the connection 23 to the shift register 11. The connection 23 in turn is connected to the pulse generator on the input side of the equipment. The generator produces a frequency $f_s=2f_{max}$, where $f_{max}$ is the highest frequency in the transmitted signal. In the equipment of FIG. 2 the connection 29 is connected to the connection 30 through which the regenerated generator frequency is fed to shift register 11. The frequency band obtained after the demodulation is then applied to a differential transformer 24, to which also the frequency band, which is filtered out by the low pass filter 27 is fed. When the frequency band, which is demodulated in the demodulator 25, is strongly attenuated, the frequency band coming from the low pass filter 27 passes first an attenuator 28 so that the two frequency bands which are fed to the differential transformer 24, have the same mean level. In the transformer 24 the two frequency bands are added the result being a frequency band, which does not have an appreciable distortion. To filter out any high harmonic frequencies coming from the demodulator 25, low pass filter 21 with an upper cut-off frequency equal to $f_{max}$ is inserted after the transformer 24. The signal passes this filter before it is finally amplified in an amplifier 22.

The advantage of distortion compensating arrangements according to the invention compared with previously known ones is further apparent from the fact that the distortion, as also mentioned in the introduction, is a function of the length of the pulses that occur in the transmission channels, increased pulse length causing increased distortion. Therefore, a compensation of the distortion by attenuation compensating networks comprising constant passive components such as resistances, coil and capacitors can be used for a certain maximum pulse length. By only an arrangement according to the invention the length of the pulse is not restricted, but the pulse length can be changed and still a satisfying distortion compensation can be obtained. This is possible owing to the fact that in the frequency band filtered out by the low pass filters and band pass filters the amplitude is represented as a function of the frequency of curves, which in corresponding frequency points have a slope of the tangent with the same value but of opposed sign. When adding these frequency bands a resulting frequency band is always obtained in which the amplitude is almost constant.

I claim:

1. In a circuit system for compensating distortions of the signals transmitted in a time-division multiplex system including transmitting means and receiving means connected by several similar transmission channels and in which an input signal fed to the transmitting means and having a frequency band wider than the band width of each of said channels is time-divided and the pulses thus obtained are distributed upon said channels and in which the pulses received in the receiving means are scanned and combined to an output signal, in combination, a gating circuit having input and output for each channel, operating circuit means including a shift register and a pulse-formed network connected to said gating circuit for feeding control pulses to the same, the input of each gating circuit being connected to one of said channels and the output to a common point, an integrating means having an input and an output, the input of the integrating means being connected to said common point through two branch circuits, one of said branches including a low pass filter and attenuating means connected in series and the other of said branches including a band pass filter and demodulating means, said low pass filter passing a frequency band corresponding to the frequency band of said incoming signal and said band pass filter passing a frequency band corresponding to a side band of a harmonic side wave in said output signal and said demodulating means having a carrier frequency equal to the frequency of said harmonic wave, the output of said integrating means being connected to the output of said receiving means.

2. A system according to claim 1 wherein a second low pass filter and an amplifying means connected in series are included in the connection between the output of said integrating means and the output of said receiving means.

3. A system according to claim 1 wherein said integrating means comprises a differential transformer.

References Cited by the Examiner

UNITED STATES PATENTS

| | | | |
|---|---|---|---|
| 2,495,739 | 1/1950 | Labin | 179—15 |
| 2,546,935 | 3/1951 | Trevor | 179—15 |

DAVID G. REDINBAUGH, *Primary Examiner.*

HERMAN K. SAALBACH, *Examiner.*